F. M. TATUM.
VEHICLE WHEEL.
APPLICATION FILED MAY 25, 1909.
1,007,615.
Patented Oct. 31, 1911.
2 SHEETS—SHEET 1.
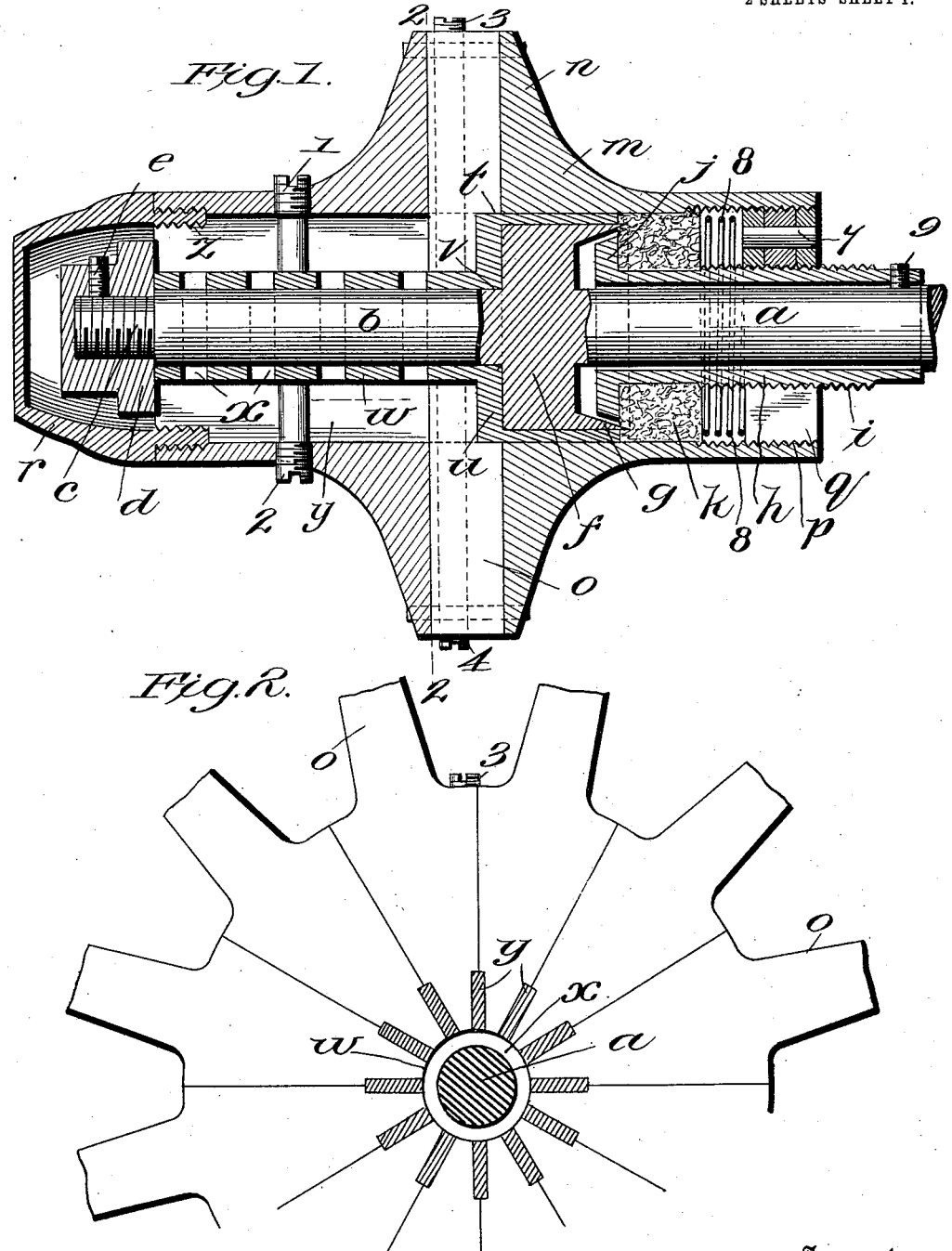

F. M. TATUM.
VEHICLE WHEEL.
APPLICATION FILED MAY 25, 1909.

1,007,615.

Patented Oct. 31, 1911.

2 SHEETS—SHEET 2.

Witnesses
Geo. H. Byrne
Jas. E. Lodge

Inventor
F. M. Tatum.
By Wilkinson, Fisher & Witherspoon
Attorneys.

UNITED STATES PATENT OFFICE.

FRANKLIN M. TATUM, OF TENAHA, TEXAS, ASSIGNOR OF THREE-FOURTHS TO J. P. CLEVENGER, OF NACOGDOCHES, TEXAS, AND ONE-FOURTH TO D. B. WOODS AND H. E. NORRIS, OF SHELBY COUNTY, TEXAS.

VEHICLE-WHEEL.

1,007,615.     Specification of Letters Patent.     Patented Oct. 31, 1911.

Application filed May 25, 1909. Serial No. 498,292.

*To all whom it may concern:*

Be it known that I, FRANKLIN M. TATUM, a citizen of the United States, residing at Tenaha, in the county of Shelby and State of Texas, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle wheels, spindles and spindle box constructions, which improvements are applicable to automobiles and vehicles generally.

The object of my invention is to provide simple and inexpensive wheel hub, spindle and spindle box constructions, which are absolutely self-lubricating when assembled.

A further object is to prevent the entrance of dust or water to the inner bearings, and prevent the escape of lubricating oil from the inner bearings of the assembled wheel hub, spindle and spindle box by packing material, employed in such capacity, as one of the component parts of my invention.

A further object is to provide metal hub casings, a sharp edged annular-flange shouldered spindle, a horizontally-ribbed spindle box, and a flanged end packing sleeve, all of which are simple and inexpensive, are readily assembled, and may be made in sizes, weights and proportions as are required, to be adapted for any kind of vehicles or automobiles.

Other objects will appear in the detailed description.

With these objects in view, my invention consists in the construction and combination of parts, as hereinafter described and claimed.

Figure 3:
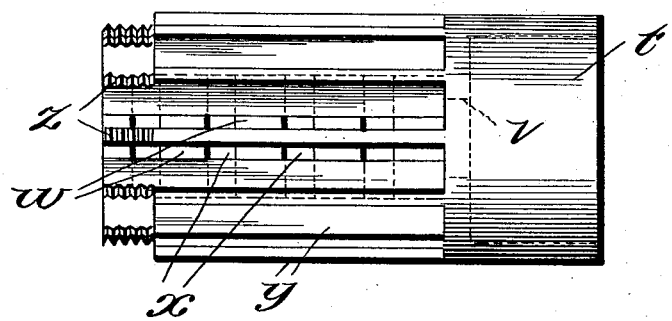
Figure 4:
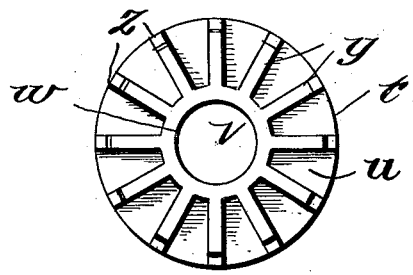
Figure 5:
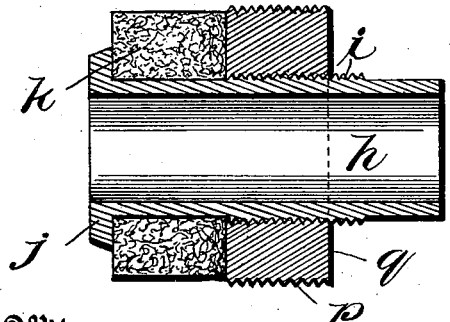
Figure 6:
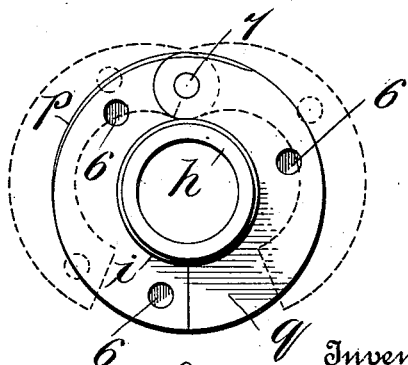

In the accompanying drawings—Figure 1 is a longitudinal section of a wheel hub constructed according to my invention. Fig. 2 is a cross section thereof, taken on the line 2—2 of Fig. 1. Fig. 3 is a side view of the spindle box. Fig. 4 is an end view of the spindle box. Fig. 5 is a cross-section of a modified form, showing the annular packing sleeve, the packing, and the locking nut, but omitting the spring. Fig. 6 is an end view of the locking nut.

$a$ represents the cylindrical portion of axle, which is provided with a cylindrical spindle portion $b$, which has its outer end reduced and screw-threaded, as shown at $c$. The spindle $b$ may be made integral with the axle $a$, or it may be made separate and connected thereto by any means desired.

$d$ represents the spindle nut that is adapted to be screwed on to the screw-threaded portion $c$, and $e$ represents a set-screw that is adapted to pass through the spindle nut $d$, and contact with or penetrate into the screw-threaded end $c$ of the spindle.

$f$ represents the spindle shoulder, which is a cylindrical extension on the spindle $b$, which shoulder $f$ is provided with a knife edged annular flange extension $g$. This knife edged extension $g$ may be made integral with the spindle shoulder $f$, or it may be made separate and connected thereto by any means desired.

The special use of the set-screw $e$ is to secure the spindle nut $d$ on to the screw-threaded end $c$ of spindle $b$, and thereby prevent the nut $d$ from being disengaged, should the vehicle on which the wheel is mounted be run backward.

Surrounding a portion of the axle $a$ is a packing sleeve $h$, which sleeve is screw-threaded, as is shown at $i$, and said packing sleeve $h$ is also provided with an annular flange or head $j$. The diameter of the sleeve $h$ is slightly greater than the axle $a$, over which it is designed to rotate.

$k$ represents packing material, which may be of wool, felt, cotton, fur, or similar material, to prevent lubricating oil from leaking out from the inner bearing parts of the assembled wheel hub, spindle and spindle box, and to prevent dust or water from entering therein. The packing material $k$ is compressed between the annular flange or head $j$ of the packing sleeve $h$, the end $t$ of the spindle box, and a spring 8 engaged by the locking and packing nut $q$. The locking and packing nut $q$ is preferably made in two parts, as shown in Fig. 6, and is adapted to be screwed on the screw-threaded portion $i$ of the sleeve $h$.

$m$ represents the hub casing, having central extensions $n$, between which spokes $o$ of the usual shape are fitted. The hub portion of the spokes is enlarged as usual, and the inner ends fit between the flanges $y$ hereinafter described. The inner end of the hub-casing is screw-threaded, as shown at $p$, and the locking and packing nut $q$, engages the screw-threaded portion $p$ and also the screw-threaded portion $i$ of the sleeve $h$. The outer end of the hub casing is screw-threaded and closed by a cap nut $r$, which cap nut screws into the interior of the outer end of said casing. This cap nut $r$ also screws over the screw-threaded end of the spindle box hereinafter described.

A side view of the spindle box is shown in Fig. 3, and it consists of a hollow cylindrical portion $t$, which surrounds the cylindrical spindle shoulder $f$ of the spindle $b$. One end of the hollow cylindrical portion $t$ is partially closed by a portion $u$, centrally perforated, as shown at $v$. This spindle box is also provided with a cylindrical extension $w$, centrally perforated, and adapted to fit over the spindle $b$. The said cylindrical portion $w$ is provided with annular oil grooves $x$, which grooves $x$ are cut through the cylindrical surface of the portion $w$, intersecting the oil pockets that are situated between the radial ribs or flanges $y$, which flanges $y$ extend outwardly from the cylindrical portion $w$, and are fitted into the inner tubular surface of the hub casing, thereby providing pockets for lubricating oil between said ribs or flanges $y$, the inner tubular surface of the hub-casing and said cylindrical portion $w$ of the spindle box. These pockets may be occasionally filled with lubricating oil, thus insuring constant lubrication. The outer ends of the horizontal ribs $y$ are reduced and screw-threaded, as shown at $z$, to engage with the screw-threads on the inner part of the cap nut $r$, which cap nut $r$ thus screwing into the casing and onto the ribbed end of the spindle box, at the same time, secures the spindle box in position in the assembled wheel hub. Through the hub casing pass bolts or screws 1 and 2, which firmly lock the casing and the cylindrical part $w$ of the spindle box together.

3 and 4 represent screws or bolts that extend through the hub casing and into the cylindrical portion of the spindle box, but since the cap nut $r$ secures the spindle box in position in the assembled wheel hub, the screws or bolts 2, 3 and 4 may be omitted and the pockets between the ribs $y$ and the interior portion of the assembled wheel hub may be supplied or filled with lubricating oil by pouring the oil through the opening made by the removal of the screw or bolt 1, which screw or bolt 1 may be replaced after the assembled wheel hub is filled with lubricating oil.

9 represents a removable screw which is used in the assemblage of my invention, and is only intended for temporary use, and any desirable screw-threaded device, lock or coupling may be substituted therefor or used in connection therewith.

Referring to Figs. 1 and 6, the locking and packing nut $q$ is split, as shown, and is composed of two parts mounted on the rod or pin 7, and the parts of said nut are also provided with indentations 6, into which a spanner wrench may be inserted, but if preferred the locking and packing nut $q$ may not be split as shown in Fig. 6, but it may be made in one integral annular nut and slipped onto the axle $a$ before the spindle $b$ is secured thereto. The nut $q$ in Fig. 5 is the same as that in Figs. 1 and 6, but in the modified form shown in Fig. 5 the spring 8 is omitted.

The locking and packing nut $q$ may be screwed onto the packing sleeve $h$, thereby compressing the packing $k$ between said spring 8 engaged by the nut $q$ and the flange or head $j$ of the packing sleeve $h$, before the parts are screwed into the hub casing $m$, and by thus assembling them and securing the packing nut $q$ and the sleeve $h$ together—with the packing $k$ and spring between them—they may be screwed into the end of hub casing $m$, engaging the screw-threads $p$ and thereby press the packing $k$ against the end $t$ of spindle box and the sharp annular flange $g$ of the spindle shoulder, to exclude dust and prevent the escape of lubricating oil from the inner bearings, just the same as when the packing sleeve $h$ is secured in stationary position with the screw and coupling 9. Therefore if it is preferred to make the locking and packing nut $q$ integral (or not split) and it is preferred to assemble and secure said integral nut $q$, sleeve $h$, spring 8 and packing $k$ together, before screwing them into the hub casing $m$ against the end $t$ of spindle box and the extended flange $g$ of spindle shoulder, the screw and coupling 9 may be omitted. Hence it is obvious that the packing $k$ may be compressed against the end $t$ of the spindle box and the flange $g$ of the spindle shoulder, either with or without the aid of the screw 9. This locking and packing nut $q$ is adapted to engage with the screw-threaded portion $i$ of the packing sleeve $h$, and the internally screw-threaded portion of the inner end of the assembled wheel-hub at $p$, thereby locking the packing sleeve $h$ together with its flange or head $j$, and the compressed packing $k$, firmly to hub-casing $m$, while the screw 9 and any auxiliary coupling holds and secures the said packing sleeve $h$ and its flange or head $j$ in stationary position, while the said locking and packing nut $q$ compresses the packing $k$ by being screwed onto the packing sleeve $h$ and into the hub casing $m$ engaging the screw-threads $i$ and $p$.

It should be noted that the extended annular knife edged flange $g$ of the spindle shoulder $f$ cuts into the packing material $k$ as the locking and packing nut $q$ is screwed onto the packing sleeve $h$ and into the hub casing $m$ at $p$, thereby compressing the packing material $k$ between the said nut $q$, the annular head or flange $j$ of packing sleeve $h$ and the cylindrical end $t$ of spindle box forcing the compressed packing material to fit closely against the extended annular knife edged flange $g$ of spindle shoulder $f$, thus preventing the entrance of dust or water into the interior of the assembled wheel hub, and preventing the lubricating oil from leaking out.

The spindle box, spindle and packing sleeve may be fitted to other forms of wheels, thereby preventing the entrance of dust or water and the leaking out of lubricating oil, and with similar constructions, any wheel-hub bearings may be made absolutely self-lubricating and dust-tight.

My invention is assembled in the following manner:—The packing sleeve $h$ is placed around the portion $a$ of the axle and secured in stationary position by the screw 9 or any auxiliary coupling. The spindle box shown in Fig. 3 is then slipped onto the spindle $b$ and the spindle nut $d$ is screwed home and fastened with the set screw $e$. The wheel hub is then slipped on over said spindle box and the cap nut $r$ screwed home, thereby locking said spindle box securely in the hub. The packing $k$ is then placed around the sleeve $h$ and forced into the interior of the hub casing $m$, the spring 8 is placed over the sleeve $h$, and the locking and packing nut $q$ is then placed around the packing sleeve $h$ and turned with a wrench so as to travel along the screw-threads $i$ and into the hub casing $m$, engaging also the screw-threads $p$, thereby compressing the packing material $k$ between the flange or head $j$ of the packing sleeve $h$, the end $t$ of the spindle box, and the spring 8 engaged by the locking and packing nut $q$, thereby forcing the compressed packing material $k$ against the annular extended knife edged flange $g$ of the spindle shoulder $f$ and to also cover over and securely close the joints between the end $t$ of spindle box and the interior of hub casing $m$, and between the end $t$ of the spindle box, and the spindle shoulder $f$. The packing sleeve $h$ is then released by removing or loosening the screw 9 or other auxiliary fastening, and the whole wheel hub, together with its packing sleeve $h$, its compressed packing $k$, and spindle box, is free to revolve or rotate on the spindle and axle. Before using the vehicle on which such wheel hubs are mounted, however, the screw 1 should be removed and the interior filled with lubricating oil and the screw then replaced. By this means the interior of the wheel hub will be thoroughly lubricated, the spaces between the flanges or ribs $y$ being filled with oil which enters through the grooves $x$. And the compressed packing material covering and pressing over the joints between the interior of the hub casing $m$ and the end $t$ of the spindle box and the bearing joint between the end $t$ of the spindle box and the spindle shoulder $f$, aided by the knife edged flange $g$ protruding and cutting into the compressed packing material $k$, absolutely prevents the oil from leaking out, or dust or water from entering therein. And since the screw 9, or any auxiliary fastening, holds and secures the packing sleeve $h$ in position until the packing $k$ is compressed and said packing sleeve $h$, together with the packing $k$, and the flange or head $j$ is securely locked to the hub casing $m$ by the locking and packing nut $q$, and the packing sleeve $h$ is thus prevented from touching any portion of the axle $a$ or spindle $b$; and the compressed packing material $k$ is prevented by the annular flange or head $j$ of the packing sleeve $h$ from touching any portion of the spindle shoulder $f$ except the sharp annular knife-edged portion of flange $g$, there is absolutely no friction engendered by the use of the packing material $k$, except the very small portion caused by the sharp circular edge of said flange $g$ cutting into the compressed packing material, which is comparatively negligible. And since the packing material $k$ is compressed between the flange or head $j$ of the packing sleeve, the end $t$ of the spindle box and the spring 8 engaged by the locking and packing nut $q$, thereby securely closing and guarding the joints between the end $t$ of spindle box, the interior of hub casing $m$ and the bearing joints between the end $t$ of spindle box and the spindle shoulder $f$, it is absolutely impossible for lubricating oil to escape from the inner bearings, or for dust or water to enter therein through said compressed packing material $k$. Hence it is only necessary that the extended, annular sharp knife-edged portion of flange $g$ of the spindle shoulder $f$ be made to extend out even or flush with the end $t$ of the spindle box and the flange or head $j$ of the packing sleeve, in order to exclude dust and water and prevent the escape of lubricating oil, from the inner bearings of the assembled wheel hub by way of said compressed packing material. But in order to compensate for any play or lateral motion given to the wheel hub on the spindle, I prefer the extended annular sharp knife-edged portion of said flange $g$ of the spindle shoulder $f$ to cut and extend into the compressed packing $k$ about one-sixteenth of an inch beyond the end $t$ of the spindle box and the flange or head $j$ of the packing sleeve, as represented in Fig. 1. Hence the packing material (as represented by $k$) is one of the very important parts of my invention, when thus installed, in the capacity of excluding dust and water and preventing the escape of lubricating oil from the inner bearings of the assembled wheel hub.

I claim:

1. In a device of the character described, the combination of the spindle portion of an axle provided with a sharp edged extension, a vehicle wheel on said spindle, a locking nut, and packing material held within said wheel by said nut and pressed by said nut against said sharp edged extension, substantially as described.

2. In a device of the character described, the combination of the spindle portion of an axle provided with an extension having a sharp edge, a vehicle wheel on said spindle, a sleeve adapted to rotate around the axle and provided with a flanged head, a locking nut engaging said sleeve and the inner part of said wheel, and packing material confined within said vehicle wheel and pressed by said locking nut against the flanged head of the sleeve and against the sharp edge of said extension, substantially as described.

3. In a device of the character described, the combination of the spindle portion of an axle, provided with an extension, a vehicle wheel carried by said spindle and said extension, a metallic boxing in said wheel, said boxing being provided with cylindrical parts connected together and mounted on the end of said spindle and the extension thereon, and also provided with flanges and oil pockets, a nut for securing said wheel on said spindle, a cap nut for closing the outer end of said wheel, packing, and means for forcibly compressing said packing against the extension on said spindle, substantially as described.

4. In a device of the character described, the combination of the spindle portion of an axle provided with an extension, a wheel carried thereby, said wheel being provided with a metallic boxing, said boxing comprising cylindrical parts connected together and mounted on said spindle and the extension thereon, and also provided with flanges and oil pockets, means for securing said wheel on said spindle, and a cap nut screwed into the outer end of said wheel and the flanges on the outer end of said boxing, substantially as described.

5. In a device of the character described, the combination of the spindle portion of an axle provided with an extension, a wheel mounted thereon, a metallic boxing having two cylindrical parts connected together, said parts being fitted over the outer end of said spindle and over said extension, respectively, one of said cylindrical parts on said boxing being provided with radial flanges and said cylindrical part being also provided with oil pockets, a nut for confining said wheel on said spindle, a cap nut engaging the outer end of the hub of said wheel and the outer end of said flanges, and means for securing said main part of said wheel and said boxing together, substantially as described.

6. In a device of the character described, the combination of the spindle portion of an axle provided with an extension having a sharp edge, a wheel carried thereby, said wheel being provided with a metallic boxing having two cylindrical parts connected together and fitting over the outer end of said spindle and said extension, respectively, said boxing being also provided with flanges and oil pockets, a sleeve adapted to fit around the axle, inside of said spindle extension, packing around said sleeve, and a nut engaging the inner part of the wheel and adapted to be screwed home to force said packing against the sharp edge of said extension, substantially as described.

7. In a device of the character described, the combination of the spindle portion of an axle provided with an extension having a sharp edge, a vehicle wheel carried thereby, said vehicle wheel being provided with two cylindrical portions connected together and fitting over the outer end of said spindle and over said extension, respectively, means for securing said wheel on said spindle, a sleeve fitting around the axle inside of said spindle extension, said sleeve being provided with an enlarged head, packing engaging said head, and a two-part nut fitting around said sleeve and screwed into the inner end of the wheel hub, thereby forcing the packing against the sharp edge of the spindle extension, substantially as described.

8. In a device of the character described, the combination of the spindle portion of an axle provided with an extension having a sharp edge, a wheel carried thereby, a metallic boxing in said wheel, composed of two cylindrical parts connected together and fitting, respectively, over the outer end of said spindle and over said extension, said boxing being provided with flanges and oil pockets, a nut for securing said wheel on said spindle, a cap nut for the outer end of the wheel hub, a sleeve provided at one end with a head and fitting around said axle inside of said spindle extension, packing adapted to rest against the head of said sleeve, and a two-part nut placed around said sleeve and screwed thereon and into the inner part of the wheel hub, thereby compressing the packing against the sharp edge of the spindle extension, substantially as described.

9. In a device of the character described, the combination of the spindle portion of an axle provided with an extension having a sharp edge, a wheel carried thereby, said wheel being provided with a metallic boxing composed of two cylindrical parts connected together and engaging, respectively, the outer end of said spindle and said extension, one of said cylindrical parts being provided with oil pockets and radial flanges, a nut holding said wheel on said spindle, packing located on the inside of said spindle extension, and a nut adapted to be screwed into the inner end of the wheel hub to compress said packing against the sharp edge of the spindle extension, said wheel being provided with a cap nut, with spokes fitting against said metallic boxing, and with removable means whereby a lubricant may be supplied to the interior of the wheel, substantially as described.

10. In a device of the character described, the combination of the spindle portion of an axle provided with an extension having a sharp edge, a wheel carried thereby, said wheel being provided with a metallic boxing composed of two cylindrical parts connected together and engaging the outer end of said spindle and said extension, respectively, said boxing being provided with radial flanges and oil pockets, a nut for holding said wheel on said spindle, a sleeve surrounding the axle and located inside of said spindle extension, said sleeve being provided with a head, packing resting against said head, a two part nut embracing said sleeve and screwed home thereon and into the inner part of the wheel hub, and a spring located between said nut and said packing, substantially as described.

11. In a device of the character described, the combination of the spindle portion of an axle provided with an extension having a sharp edge, a wheel carried thereby, said wheel having on its inside a metallic boxing composed of two cylindrical parts united together and engaging, respectively, with the outer end of said spindle and with the extension thereon, said boxing being also provided with oil pockets and radial flanges, a nut for securing said wheel to said spindle, means for locking said nut, said wheel being provided with a cap nut on the outer part of the wheel hub, a sleeve surrounding the axle and located inside of the spindle, and provided with a head, packing resting against said head, and a two-part nut screwed home on said packing and into the inner part of the wheel hub to compress said packing against the sharp edge of the spindle extension, and a set screw to temporarily secure said packing sleeve in stationary position, while said two-part nut is screwed against said packing, substantially as described.

12. In a device of the character described, the combination of the spindle portion of an axle provided with an extension having a sharp edge, a metallic box composed of two cylindrical parts united together and mounted upon said spindle, engaging respectively with the outer end of said spindle and with the extension thereon, said spindle box being also provided with radial flanges, oil grooves and pockets, a nut for securing said spindle box to said spindle, means for locking said nut, a wheel hub mounted on said spindle box, provided with a cap nut locking said spindle box and said wheel hub together and thereby closing the outer end of said wheel hub, a removable bolt or screw through the outer casing of said wheel hub by which the interior may be supplied with lubricating oil, a sleeve surrounding the axle and located inside of the spindle and spindle extension, said sleeve being provided with a head and packing resting against said head, a two-part nut screwed home against said packing and into the interior part of the wheel hub to compress said packing against the sharp edge of the spindle extension, a set screw to temporarily secure said packing sleeve in stationary position while said two-part nut is screwed home against said packing, said packing material serving to exclude dust and water and prevent the escape of lubricating oil from the inner bearings of the assembled wheel hub, spindle and spindle box, substantially as described.

In testimony whereof, I affix my signature, in presence of two witnesses.

FRANKLIN M. TATUM.

Witnesses:
JAMES W. TRUITT,
A. M. BURNS.

Copies of this patent may be obtained for five cents each, by addressing the "Commissioner of Patents, Washington, D. C."